United States Patent
Kim et al.

(10) Patent No.: US 11,668,436 B2
(45) Date of Patent: Jun. 6, 2023

(54) PRESSURE VESSEL BOSS AND PRESSURE VESSEL HAVING SAME

(71) Applicant: LOTTE CHEMICAL CORPORATION, Seoul (KR)

(72) Inventors: Dae Gun Kim, Daejeon (KR); Kyo Min Lee, Daejeon (KR); Young Koan Ko, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 17/298,422

(22) PCT Filed: Nov. 28, 2019

(86) PCT No.: PCT/KR2019/016634
§ 371 (c)(1),
(2) Date: May 28, 2021

(87) PCT Pub. No.: WO2020/111840
PCT Pub. Date: Jun. 4, 2020

(65) Prior Publication Data
US 2022/0112985 A1    Apr. 14, 2022

(30) Foreign Application Priority Data

Nov. 30, 2018  (KR) .................. 10-2018-0152329

(51) Int. Cl.
*F17C 1/16*         (2006.01)
(52) U.S. Cl.
CPC ........ *F17C 1/16* (2013.01); *F17C 2201/0109* (2013.01); *F17C 2203/0604* (2013.01);
(Continued)

(58) Field of Classification Search
CPC ............... F17C 1/16; F17C 2201/0109; F17C 2203/0604; F17C 2203/0636;
(Continued)

(56) References Cited

U.S. PATENT DOCUMENTS

| 8,967,417 B2* | 3/2015 | Sharp ................. F17C 1/16 |
| | | 220/240 |
| 2008/0187697 A1* | 8/2008 | Amano .............. B29C 66/54 |
| | | 156/272.8 |

(Continued)

FOREIGN PATENT DOCUMENTS

| CN | 102182910 A | 9/2011 |
| CN | 102840440 A * | 12/2012 ............... F17C 1/16 |

(Continued)

OTHER PUBLICATIONS

"groove," Merriam-Webster Definition, retrieved May 16, 2022 from https://www.merriam-webster.com/dictionary/groove (Year: 2022).*

(Continued)

*Primary Examiner* — John K Fristoe, Jr.
*Assistant Examiner* — Laura E. Parker
(74) *Attorney, Agent, or Firm* — Osha Bergman Watanabe & Burton LLP

(57) ABSTRACT

Disclosed are a pressure vessel boss and a pressure vessel having same, the boss comprising: a boss body in which a through hole configured to connect an interior to an exterior of the pressure vessel is formed; and a boss joint portion which surrounds an outer surface of the boss body, radially extends outward, and has an outer surface coming into surface contact with and joined to an opening surface of a liner, wherein the outer surface has a cross-sectional shape having three or more line segments connecting a top to a (Continued)

bottom of the boss joint portion and including at least one convex corner and at least one concave corner.

14 Claims, 10 Drawing Sheets

(52) U.S. Cl.
CPC ... *F17C 2203/066* (2013.01); *F17C 2203/0636* (2013.01); *F17C 2203/0663* (2013.01); *F17C 2205/0305* (2013.01); *F17C 2209/2127* (2013.01); *F17C 2209/234* (2013.01); *F17C 2221/012* (2013.01)

(58) Field of Classification Search
CPC ........ F17C 2203/066; F17C 2203/0663; F17C 2205/0305; F17C 2209/2127; F17C 2209/234; F17C 2221/012; F17C 2205/0302; F17C 2205/0308
USPC .................................................. 220/581, 590
See application file for complete search history.

(56) References Cited

U.S. PATENT DOCUMENTS

| | | | | |
|---|---|---|---|---|
| 2010/0255234 | A1* | 10/2010 | Koetke | B29C 49/20 428/35.8 |
| 2011/0210127 | A1* | 9/2011 | Strack | F16J 12/00 220/586 |
| 2012/0205337 | A1* | 8/2012 | Holbach | F17C 13/06 215/40 |

FOREIGN PATENT DOCUMENTS

| | | | |
|---|---|---|---|
| CN | 107543026 A | 1/2018 | |
| CN | 108131558 A | 6/2018 | |
| DE | 102017201672 A1 | 7/2018 | |
| EP | 3263968 A1 * | 1/2018 | ....... B60K 15/03177 |
| JP | H06137433 A | 5/1994 | |
| JP | H09159073 A | 6/1997 | |
| JP | 2008164134 A | 7/2008 | |
| JP | 2017089724 A | 5/2017 | |
| JP | 2018004072 A | 1/2018 | |
| KR | 101791095 B1 | 10/2017 | |
| KR | 20180002160 A | 1/2018 | |
| TW | I599735 B | 9/2017 | |
| WO | 2012131724 A2 | 10/2012 | |
| WO | WO-2014014049 A1 * | 1/2014 | ................ F17C 1/06 |
| WO | WO-2015197357 A1 * | 12/2015 | .............. F17C 13/06 |
| WO | 2018002788 A1 | 1/2018 | |
| WO | WO-2018002788 A1 * | 1/2018 | ................ F17C 1/16 |

OTHER PUBLICATIONS

International Search Report issued in International Application No. PCT/KR2019/016634 dated Mar. 24, 2020 (2 pages).

Written Opinion issued in International Application No. PCT/KR2019/016634 dated Mar. 24, 2020 (5 pages).

Extended European Search Report issued in corresponding EP Application No. 19888553.5 dated Jul. 1, 2022 (7 pages).

Office Action issued in corresponding JP Application No. 2021-529361 with English translation dated Apr. 22, 2022 (8 pages).

Office Action issued in corresponding CN Application No. 201980075875.9 with English translation dated Apr. 20, 2022 (18 pages).

* cited by examiner

[Fig. 1]
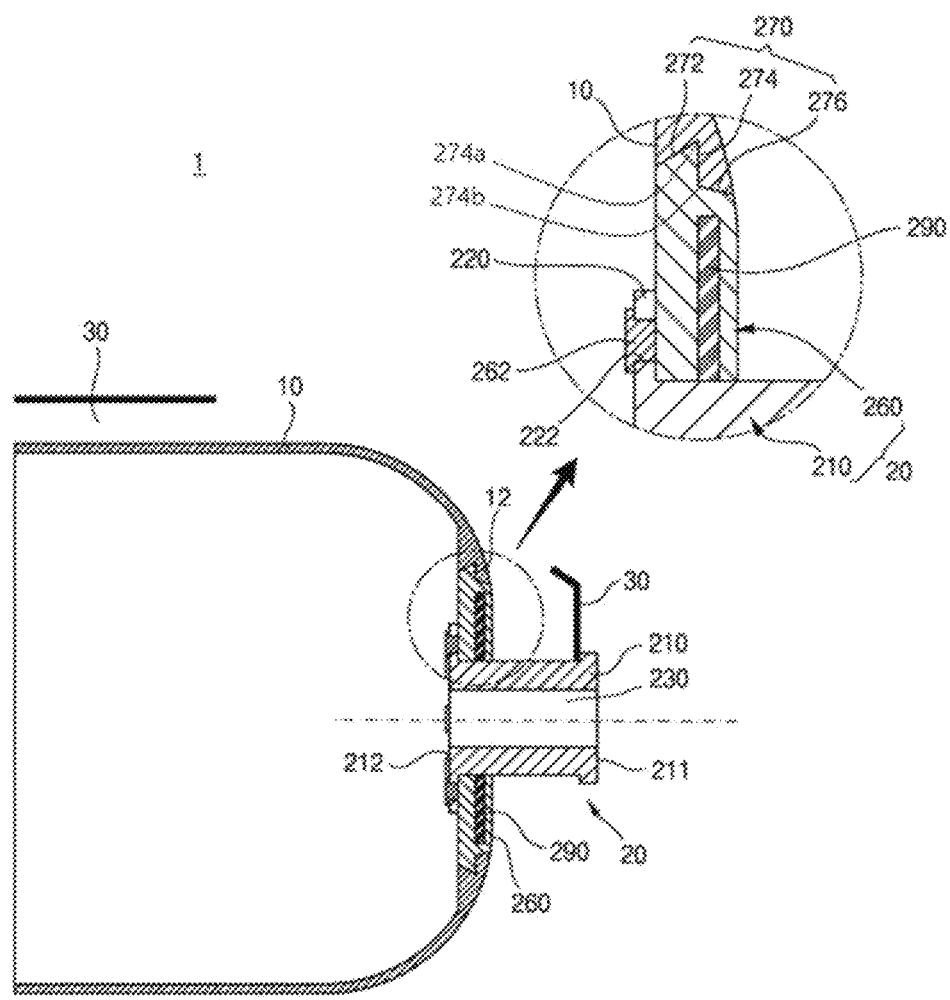

[Fig. 2]
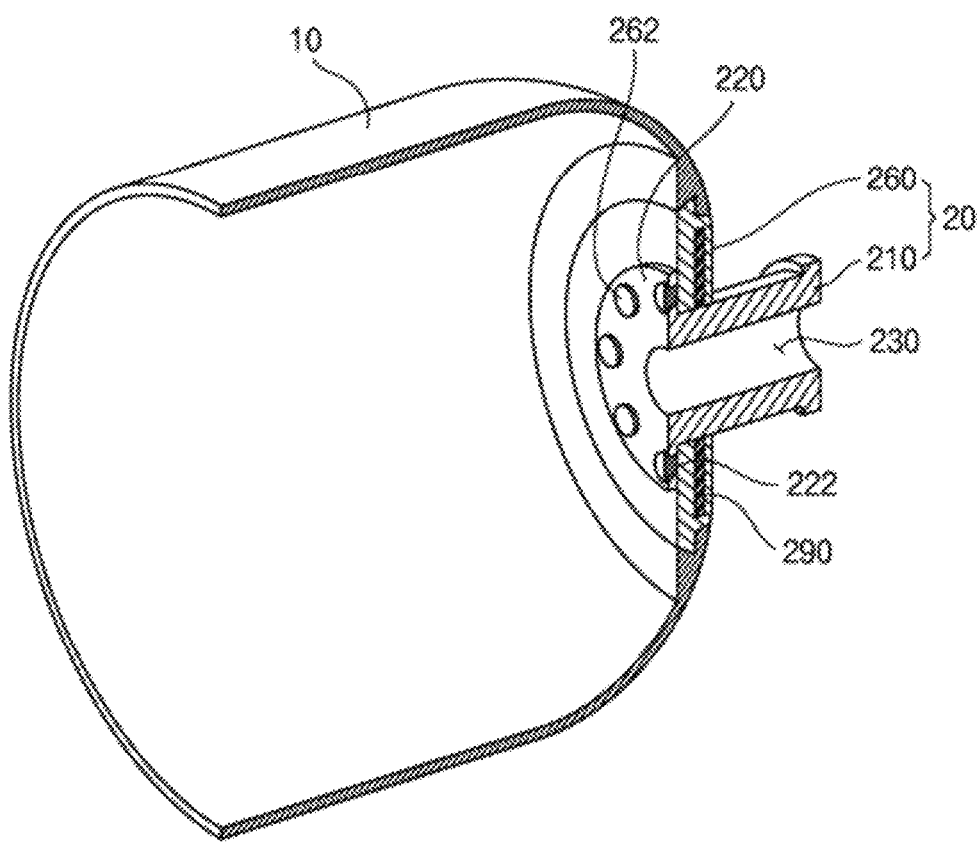

[Fig. 3]
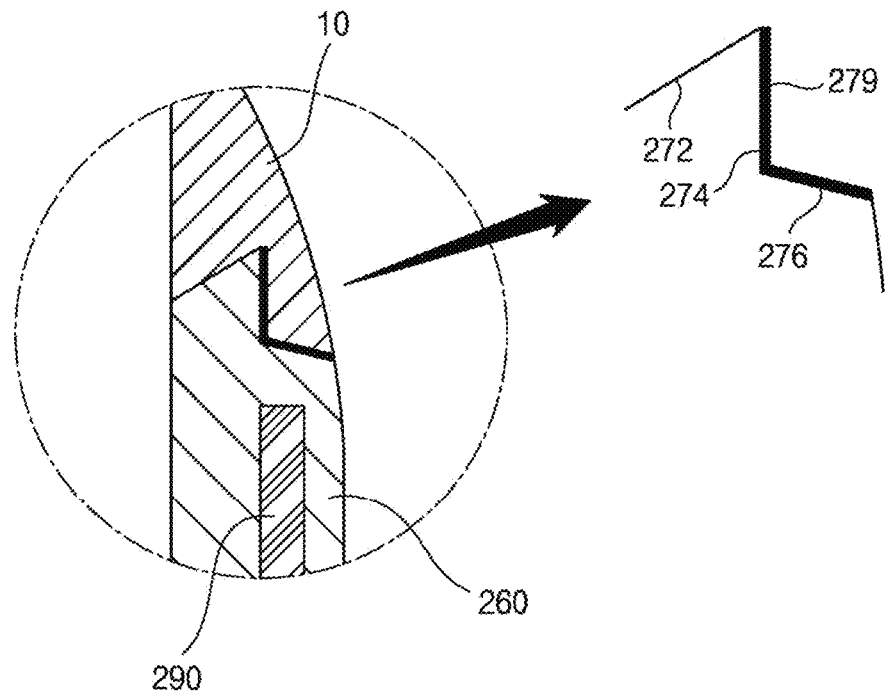
(a)
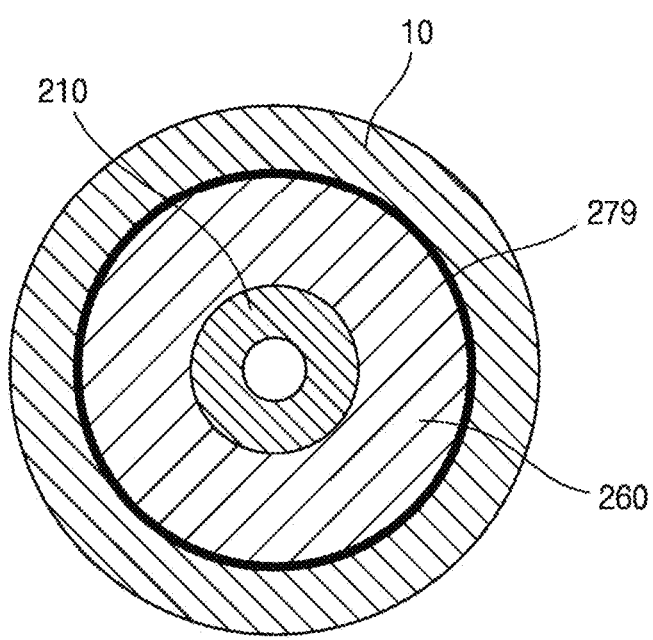
(b)

[Fig. 4]
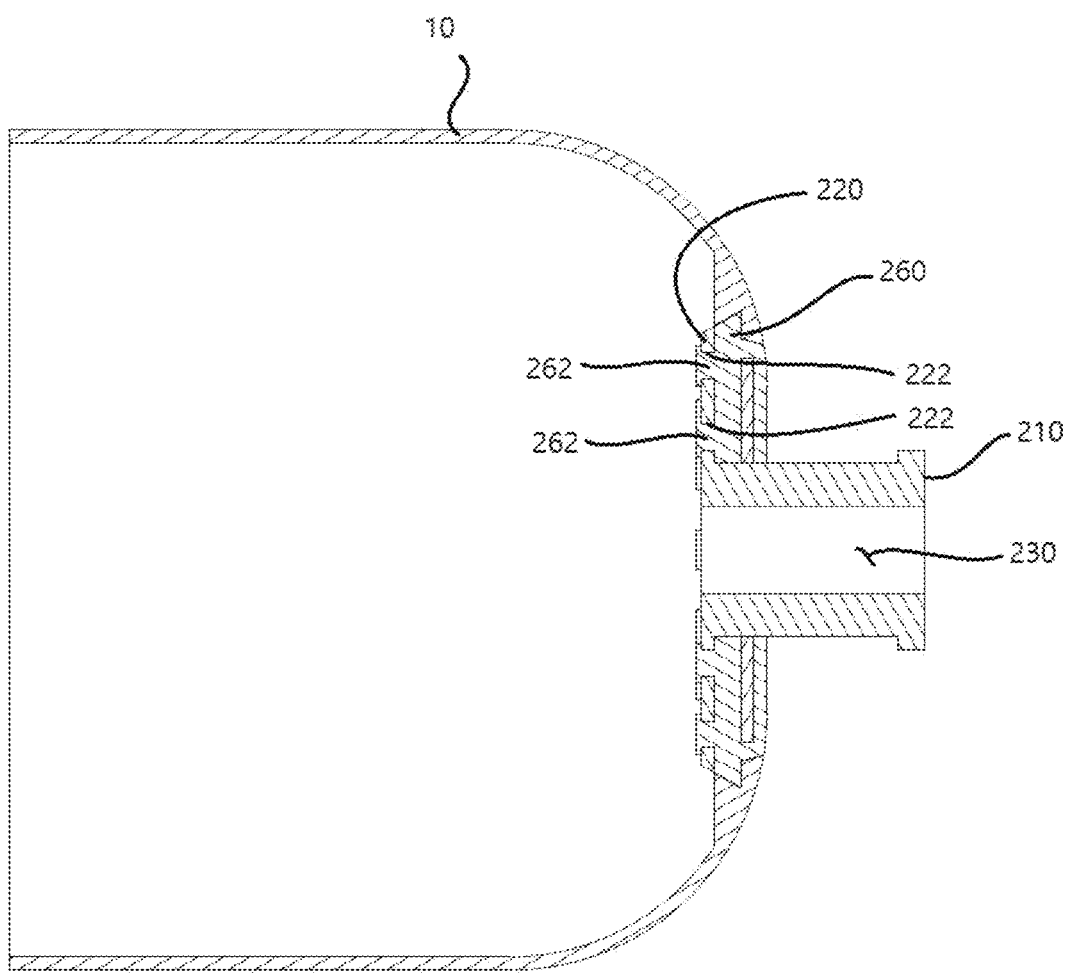

[Fig. 5]
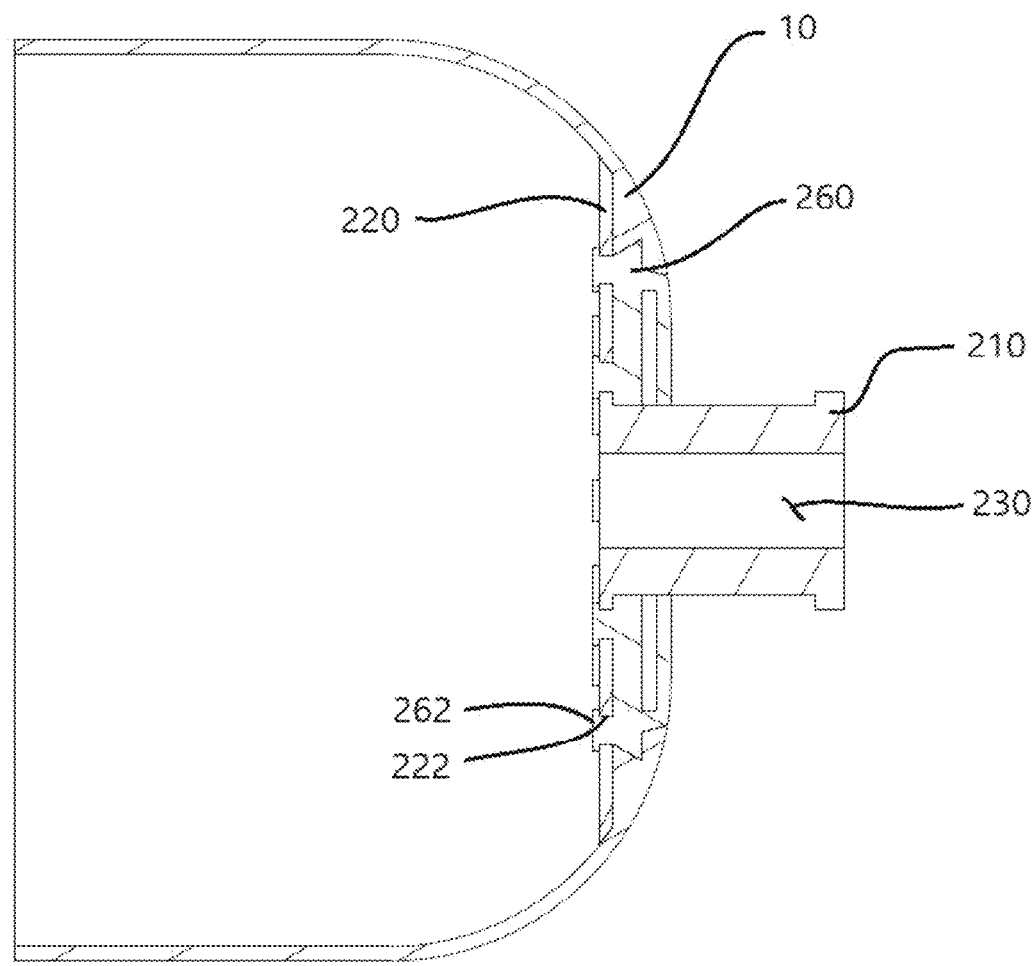

[Fig. 6A]
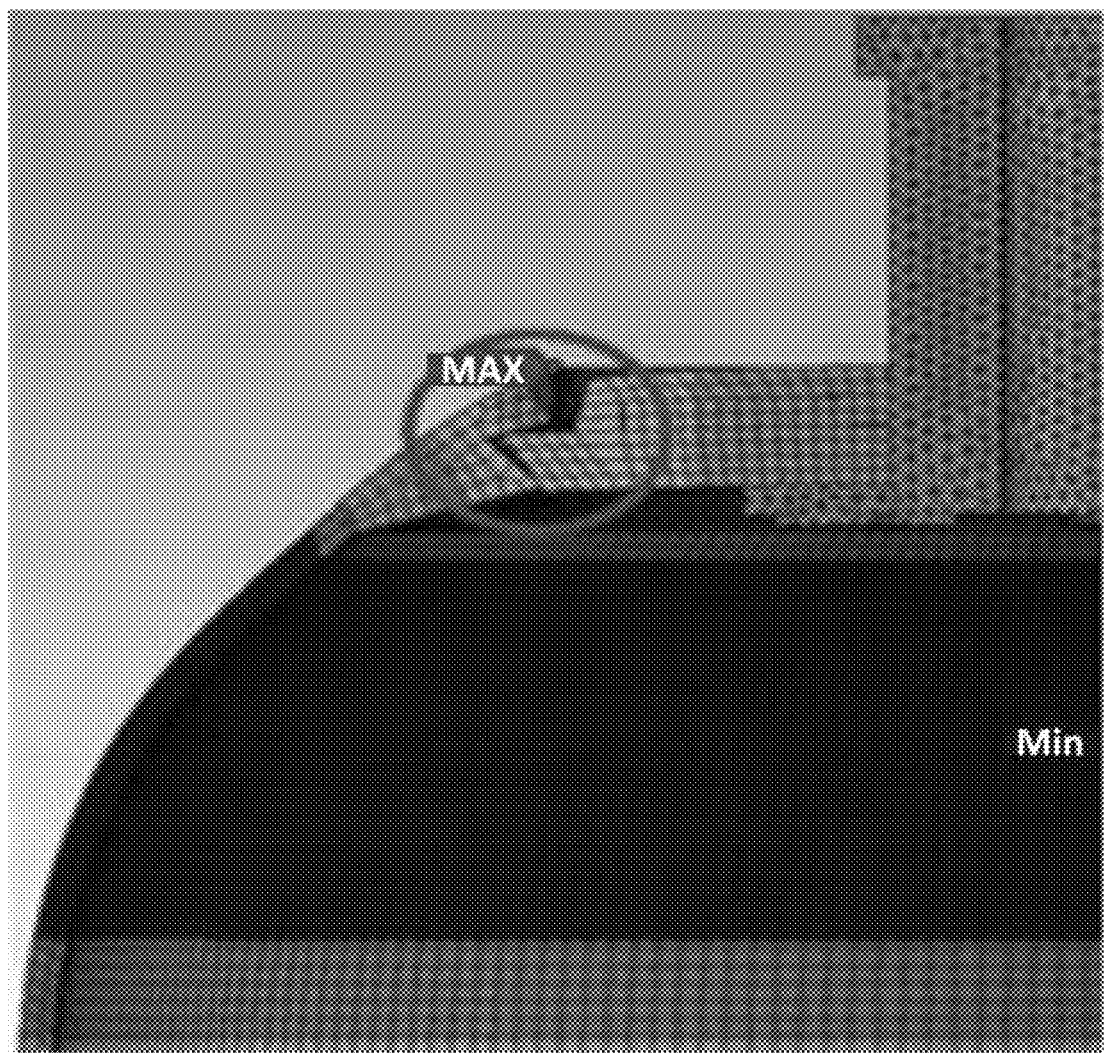

[Fig. 6B]
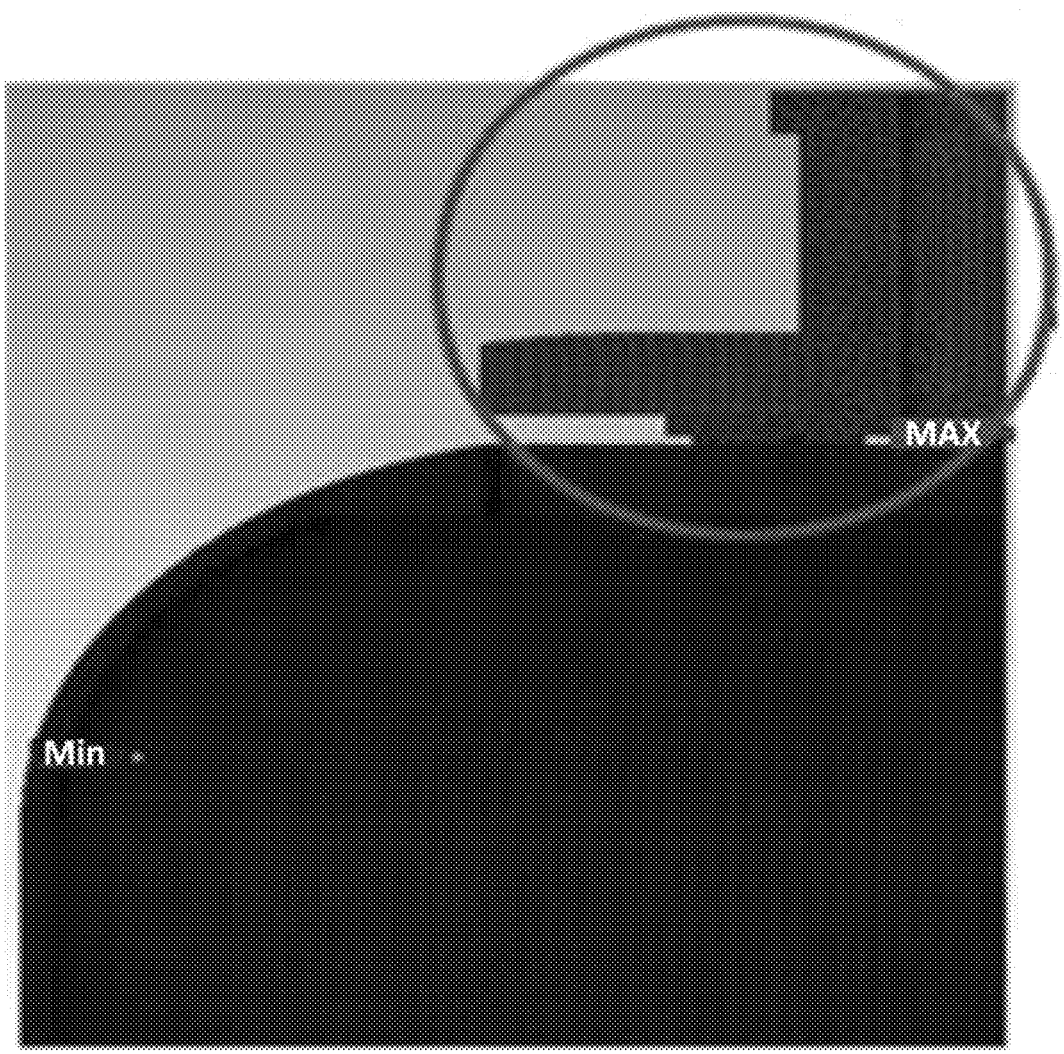

[Fig. 6C]
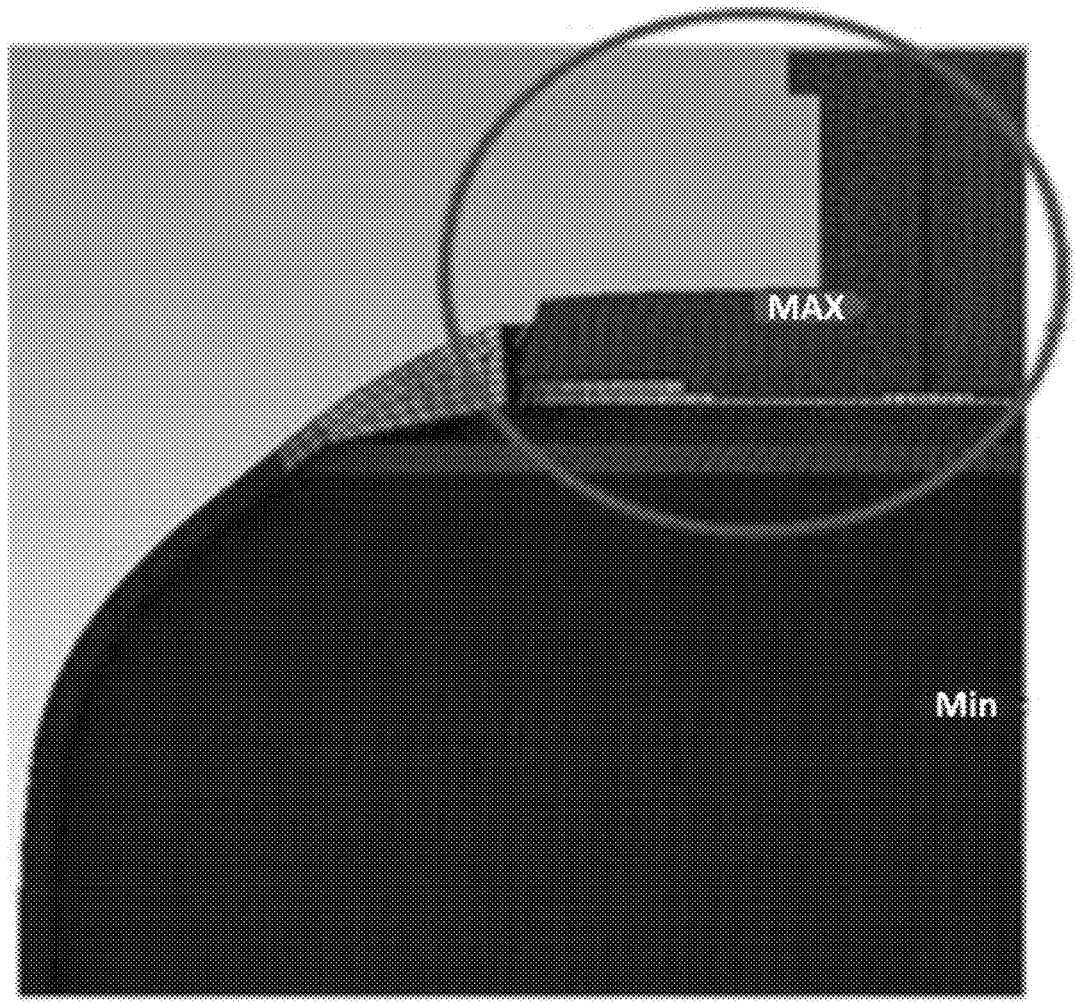

[Fig. 7]
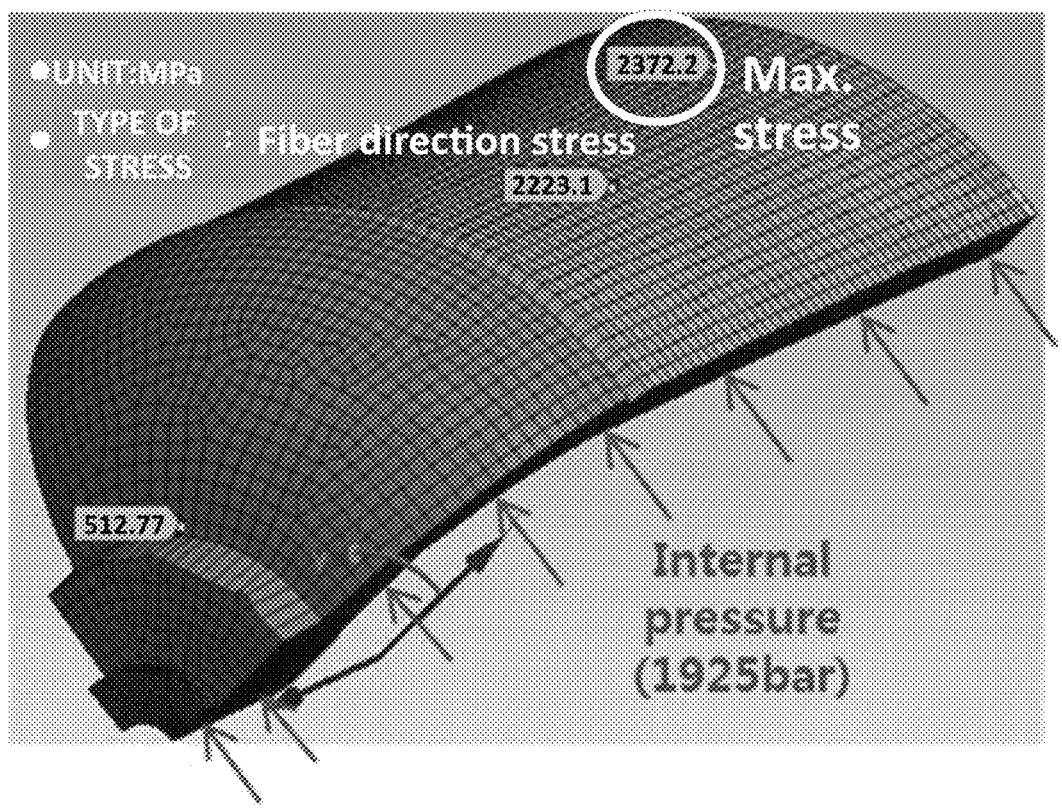

[Fig. 8]
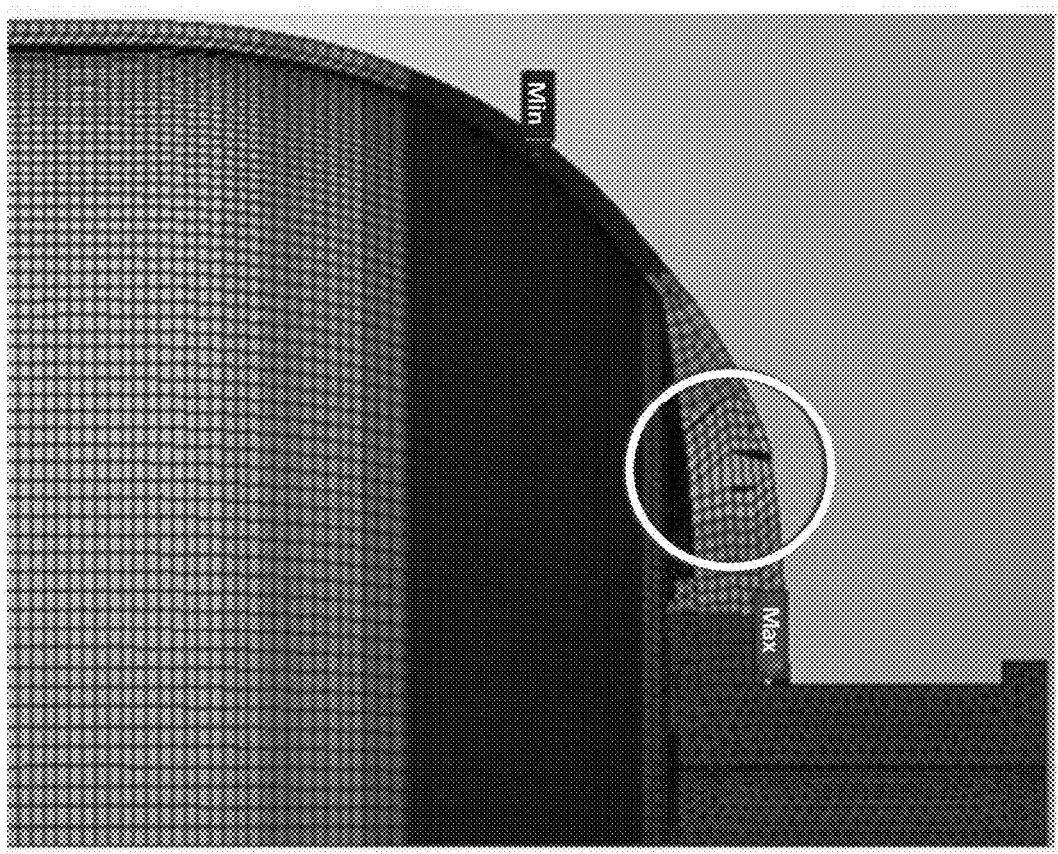

PRESSURE VESSEL BOSS AND PRESSURE VESSEL HAVING SAME

TECHNICAL FIELD

The present invention relates to a pressure vessel, and more particularly, to a pressure vessel boss configured to form a port in a pressure vessel used for storing high-pressure gases, and the like and a pressure vessel including the same.

BACKGROUND ART

Pressure vessels are generally used to store pressurized fluids of oxygen, natural gas, nitrogen, hydrogen, propane, and other fuels therein.

Pressure vessels are generally classified into four types according to used materials and a method of reinforcing composite materials. Among them, a pressure vessel of TYPE-4 is a composite pressure vessel manufactured by winding carbon fiber or glass fiber impregnated with a resin on a plastic liner in a circumferential direction and a longitudinal direction in which the plastic liner performs a function of preventing a gas from leaking while barely adding a load. Such pressure vessels of TYPE-4 have excellent lightening ability, stability, and performance, already are widely used as a fuel storage tank for a compressed natural gas for a vehicle, and recently have been developed as a fuel tank of a hydrogen fuel cell vehicle and have attracted great attention.

In the pressure vessel, a port that is a part communicating with an interior thereof forms a fuel inlet. Until now, the port has been formed by binding a metallic boss to a plastic liner in order to be firmly coupled to a valve or a regulator manufactured using a metallic material and to prevent damage to a screw thread.

However, since the plastic liner and the metallic boss are different materials, it is difficult to couple the plastic liner and the metallic boss using an adhesive. Accordingly, when a gaseous fuel at a high pressure, for example of 200 to 700 bars, is stored in the pressure vessel, gases may leak through a coupled part between the plastic liner and the metallic boss due to high pressure, or the boss may be detached from the liner.

DISCLOSURE

Technical Problem

The present invention is directed to providing a boss for a pressure vessel, which has a structure having improved bond strength of an interface with a liner and a pressure vessel including the same.

The present invention is also directed to providing a boss for a pressure vessel, in which a part joined to a liner is formed of a plastic material or a fiber-reinforced plastic so that bond strength of an interface with a liner is improved, and a pressure vessel including the same.

The present invention is also directed to providing a boss for a pressure vessel, in which a metallic boss body and a boss joint portion formed of plastic or fiber-reinforced plastic are integrally formed, and a pressure vessel including the same.

Technical Solution

One aspect of the present invention provides a boss for a pressure vessel. The boss includes a boss body, in which a through hole configured to connect an interior to an exterior of the pressure vessel is formed, and a boss joint portion which surrounds an outer surface of the boss body, radially extends outward, and has an outer surface coming into surface contact with and joined to an opening surface of a liner. Here, the outer surface has a cross-sectional shape having three or more line segments connecting a top to a bottom of the boss joint portion and including at least one convex corner and at least one concave corner.

The outer surface may include a stepwise cross section including side parts spaced apart from each other and a stepped surface connecting the side parts.

Each of the side parts may be formed to be tapered.

A first side part on a lower side of the boss joint portion may have a greater separation distance from a central line than a second side part on an upper side thereof.

The first side part and the second side part may be tapered in opposite directions. Here, the first side part may be tapered in a shape in which a radial distance from the central line is gradually reduced toward the bottom of the boss joint portion.

At least a part of an interface on which the opening surface of the liner and the outer surface of the boss joint portion are bonded may be laser-fused, wherein the second side part and the stepped surface may be laser-fused.

The boss body may be formed of a metallic material. The boss joint portion may be integrally molded with the boss body through injection molding of a plastic material or a plastic composite material. The composite material may be formed of a fiber-reinforced composite material in which a plastic material is reinforced with carbon fiber or glass fiber. The plastic material of the boss joint portion may be formed of a polyolefin-based resin, a polyamide-based resin, or a composite resin including at least one of a polyolefin-based resin and a polyamide-based resin.

The boss joint portion and the boss body may be integrally injection molded to be additionally fixed by a physical coupling portion including a fixing groove and a fixing protrusion. To this end, the boss body may include a flange portion formed on a lower side to radially extend along the bottom of the boss joint portion and including a plurality of such fixing grooves, and the boss joint portion may include such fixing protrusions protruding through the fixing grooves and having ends radially extending and held by the flange portion.

The boss may include a metal ring surrounding an outer circumferential surface of the boss body and extending toward an interior of the boss joint portion.

Another aspect of the present invention provides a pressure vessel including a plastic liner, a boss comprising a metallic boss body, in which a through hole is formed, and a boss joint portion formed of a plastic material or a plastic composite material, surrounding an outer surface of the boss body and radially extending outward therefrom and having an outer surface coming into surface contact with and joined to an opening surface of the liner, in which the outer surface has a cross section including a first side part on a lower side, a second side part on an upper side, and a stepped surface connecting the first and second side parts to each other, the first side part is tapered to gradually reduce a radial distance from a central line of the through hole toward the bottom, and the second side part is tapered in a direction opposite to the first side part, the boss joint portion comprising a physical coupling portion to be physically fixed to the boss body and integrally molded with the boss body, and a composite shell surrounding an outer circumferential surface of the liner.

The liner may be integrally molded with the boss through blow molding so that the outer surface of the boss body and the opening surface of the liner may come into surface contact with and be joined to each other.

A laser-fused interface is formed by performing laser fusion on at least one of the second side part and the stepped surface located between the first side part and the second side part.

The physical coupling portion may include a plurality of fixing grooves formed in the flange portion formed on a lower side of the boss body to radially extend along a bottom of the boss joint portion and fixing protrusions formed while the boss joint portion is integrally molded with the boss body, protruding through the fixing grooves, and having ends radially extending and held by the flange portion.

The flange portion may be formed to be at least larger than or equal to a bottom of the boss joint portion so as to cover the bottom of the boss joint portion. More advantageously, the flange portion may have an outer end formed to extend to come into contact with the liner not to form a step between the flange portion and the liner.

Advantageous Effects

According to the present invention, a pressure vessel may be provided in which bond strength of an interface between a liner and a boss is improved so that an effect of blocking a leakage of gases at the interface between the liner and the boss is excellent.

According to the present invention, since the boss joined to the liner formed of the plastic material includes a boss joint portion formed of plastic or fiber-reinforced plastic and a same type material joint is formed between the liner and the boss joint portion, bond strength at the interface may be improved and an additional interface bond strength improved effect may be provided through laser fusion.

According to the present invention, since the boss is formed through injection molding heterogeneous materials to have a physical coupling portion, even when the boss is formed through injection molding of heterogeneous materials, structural stability may be secured.

DESCRIPTION OF DRAWINGS

FIG. 1 is a partial cross-sectional view of a pressure vessel according to an embodiment of the present invention.

FIG. 2 is a partial perspective cross-sectional view of the pressure vessel according to the present invention.

FIGS. 3A and 3B are views illustrating a fused interface between a liner and a boss in the pressure vessel according to the embodiment of the present invention.

FIG. 4 is a view illustrating a modified example of a flange portion in the boss according to the embodiment of the present invention.

FIG. 5 is a view illustrating another modified example of the flange portion in the boss according to the embodiment of the present invention.

FIGS. 6A to 6C are views illustrating a structural analysis result in preparation for a coupling force at a joint interface between the liner and the boss according to a shape of an outer surface of a boss joint portion in the pressure vessel according to the embodiment of the present invention.

FIG. 7 is a view illustrating a structural analysis result of a state in which a composite shell is applied to the pressure vessel according to the embodiment of the present invention.

FIG. 8 is a view illustrating a structural analysis result in order to confirm an effect of laser-fused interface in the pressure vessel boss according to the embodiment of the present invention.

MODES OF THE INVENTION

Since the present invention may be variously modified and have a variety of forms, particular embodiments will be described in detail in the text. However, these are not intended to limit the present invention to a particularly disclosed form and it should be understood that the present invention includes all changes, equivalents, and substitutes included within the concept and technical scope of the present invention. In a description on each drawing, like elements will be referred to as like reference numerals. Herein, the terms which refer to components are used to distinguish one component from another component. The terms used herein are used merely for describing particular embodiments and are not intended to limit the present invention. Singular expressions, unless clearly defined otherwise in context, include plural expressions.

Hereinafter, an embodiment of the present invention will be described in detail with reference to the drawings.

FIG. 1 is a partial cross-sectional view of a pressure vessel according to an embodiment of the present invention, and FIG. 2 is a partial perspective cross-sectional view of the pressure vessel according to the present invention.

A pressure vessel 1 according to an embodiment of the present invention includes a hollow liner 10 and a boss 20 provided at an opening 12 of the liner 10 to form a port of the pressure vessel. Also, the pressure vessel 1 includes a composite shell 30 (only a part of the composite shell is shown in FIG. 1) formed of a glass fiber layer or a carbon fiber layer on an outer circumferential surface of the liner 10.

The liner 10 according to the embodiment of the present invention may be formed of a plastic material and prevents high-pressure gases accommodated in the pressure vessel 1 from leaking.

As shown in the drawing, the boss 20 according to the embodiment of the present invention is disposed at the opening 12 of the liner 10 and forms the port. According to a method of manufacturing the pressure vessel according to the embodiment of the present invention, the boss 20 is provided and the liner 10 is formed through blow-molding or the like so that the boss 20 and the liner 10 may be integrally molded.

The boss 20 includes a boss body 210 and a boss joint portion 260. According to the embodiment of the present invention, the boss body 210 may be formed of a metallic material, and the boss joint portion 260 may be formed of a plastic material or a fiber-reinforced composite material including a plastic material and may be integrally molded with the boss body by injection of heterogeneous materials. That is, the metallic boss body 210 may be disposed in an insert mold and may be integrally molded by insert-injecting a material for forming the boss joint portion 260.

The boss body 210 includes a cylindrical shape in which a through hole 230 is longitudinally formed in a central part between a top 211 located outside the pressure vessel 1 and a bottom 212 located inside the pressure vessel 1. In the specification, a top and a bottom are defined on the basis of a state in which the pressure vessel 1 shown in FIG. 1 is made to stand so that the boss 20 is located upward. On the basis of FIG. 1, a right side is a top of the pressure vessel 1 and a left side is a bottom of the pressure vessel 1.

The through hole 230 connects an interior and an exterior of the pressure vessel 1 and becomes a flow path of a gas to be stored in the pressure vessel 1. In the case of a hydrogen fuel cell vehicle, a regulator, a valve, or the like may be coupled to the boss body 210 so as to supply hydrogen fuel to the fuel cell.

The boss joint portion 260 is formed to surround an outer circumferential surface of the boss body 210 and extends outward in a radial direction at a lower side of the boss body 210. The boss joint portion 260 is formed to have a circular plate shape or a polygonal plate shape which has an outer surface 270 coming into surface-contact with a surface of the opening 12 of the liner 10.

In the boss joint portion 260, the outer surface 270 has a cross-sectional shape which has three or more line segments which connect the top to the bottom and includes at least one convex corner 274a and at least one concave corner 274b. The outer surface 270 may include at least two side parts 272 and 276 spaced apart from each other and a stepped surface 274 which connects the at least two side parts 272 and 276 so that the outer surface 270 has a stepped cross section formed of the side parts 272 and 276 and the stepped surface 274.

The side parts 272 and 276 may be formed to be tapered. Accordingly, the side parts 272 and 276 are formed to be tilted so that a radial distance from a central line is changed from any one side to the opposite side. Also, the side parts 272 and 276 may be formed to have different separation distances from the central line passing through the through hole 230 in the radial direction. In the specification, the separation distances of the tapered side parts 272 and 276 are defined as distances from the central line to a furthermost point in the radial direction in the cross section. Referring to FIG. 1, a separation distance of a first side part 272 is a distance from the central line to the convex corner 274a and a separation distance of the second side part 274 is a distance from the central line to the concave corner 274b. The stepped surface 272 is defined as a line segment which connects the convex corner 274a to the concave corner 274b in the cross section. The boss joint portion 260 may have a variety of shapes of outer surfaces which have different separation distances of the respective side surfaces 272 and 276 and may have a variety of different tapered directions of side parts.

Referring to the drawings, the outer surface 270 according to the embodiment of the present invention includes the first side part 272 located on a bottom side and the second side part 276 located on a top side. The first side part 272 is disposed having a greater separation distance from the central line than that of the second side part 276 and is connected through the stepped surface 274 between the first side part 272 and the second side part 274. Also, the first side part 272 and the second side part 276 are tapered in opposite directions. Here, it is advantageous that the first side part 272 is tapered so as to reduce a distance from the central line toward the bottom and the second side part 276 is tapered so as to reduce a distance from the central line toward the top. Accordingly, the first side part 272 and the second side part 276 may have outer conical or polypyramid surfaces having opposite tilts. Accordingly, in the cross-sectional view of FIG. 1, the first side part 272 and the second side part 276 form tilted surfaces having opposite tilts. However, the present invention does not exclude a case in which distances of the first side part 272 and the second side part 276 from the central line are tapered to be gradually reduced stepwise. In this case, the first and second side parts 276 have a step-shaped contour.

According to the embodiment of the present invention, in the pressure vessel 1, when the boss 20 is perspectively observed from the top 211 to the bottom 212 of the boss body 210, the second side part 276 and the stepped surface 274 of the boss joint portion 260 may be observed.

While the pressure vessel 1 is manufactured, the liner 10 may be integrally molded with the boss 20 through, for example, blow molding. In a process of molding the liner 10 and the boss 20 integrally, a surface of the opening 12 of the liner 10 and the outer surface 270 of the boss joint portion 260 which comes into surface-contact therewith are integrally joined. Also, a bottom of the boss joint portion 260 is formed to be parallel to a surface of an internal end of the liner 10 and a top of the boss joint portion 260 is formed to be parallel to a surface of an external end of the liner 10.

In the pressure vessel according to the embodiment of the present invention, since both the surface of the opening 12 of the liner 10 and the outer surface 270 of the boss joint portion 260 which are joined to each other have plastic materials, it is possible to form a firm joint between interfaces during an integral molding process.

FIGS. 3A and 3B are views illustrating a laser-fused interface between the liner and the boss joint portion at a port of the pressure vessel according to the embodiment of the present invention.

According to the embodiment of the present invention, a fused interface is formed in order to improve adhesion of a joint interface between the boss joint portion 260 and the liner 10. To this end, laser fusing, thermal fusion, pressure-fusing, or the like may be performed. FIGS. 3A and 3B illustrate an embodiment, in which a laser-fused interface is formed, using a laser, on the second side part 276 and the stepped surface 274 of the joint interface between the liner 10 and the boss joint portion 260.

As described above, according to one embodiment of the present invention, since the second side part 276 and the stepped surface 274 have surfaces facing the top surface of the boss body 210, the laser easily passes therethrough. Accordingly, a fused interface 279 may be easily formed on the joint interface between the second side part 276 and the stepped surface 274 using the laser from the top surface of the boss body 210. Accordingly, adhesion between the liner 10 and the boss 20 is improved. The laser-fused interface 279 may be formed on an overall interface where the liner 10 and the boss joint portion 260 come into contact with each other including the second side part 276 and the stepped surface 274 but the present invention is not limited to the second side part 276 and the stepped surface 274. The laser-fused interface is formed on at least any one of the second side part 276 and the stepped surface 274 and, more preferably, at least the second side part 276 and the stepped surface 274.

FIG. 3B illustrates that the laser-fused interface 279 is formed along the interface between the liner 10 and the boss joint portion 260 of the boss 20 according to the embodiment of the present invention. It is advantageous that the laser-fused interface 279 formed between the liner 10 and the boss joint portion 260 is formed at a depth within a range of 10 mm from an outer surface of the liner 10. That is, it is advantageous that the stepped surface 274 is formed within the range of 10 mm from the outer surface of the liner 10. Accordingly, the stepped surface may be more firmly formed through the laser-fused interface 279 by improving laser penetration performance.

Referring back to FIGS. 1 and 2, as described above, the boss body 210 and the boss joint portion 260 according to the embodiment of the present invention may be formed of heterogeneous materials and may be integrally formed through insert-injection molding.

The boss body 210 may be formed by cutting an aluminum material.

The boss joint portion 260 may be formed of a plastic material or a fiber-reinforced composite material in which a plastic material is reinforced with fiber. Here, the plastic material may be a polyolefin-based resin (for example, high-density polyethylene (HDPE), polypropylene (PP), or the like), a polyamide-based resin (for example, polyamide (PA6), PA66, or the like), or a plastic composite material.

It is advantageous that the fiber-reinforced composite material is formed of a long-fiber reinforced thermoplastic (LFT) or short-fiber reinforced thermoplastic (SFT) which include the above plastic material with carbon fiber (CF) or glass fiber (GF).

According to the embodiment of the present invention, when the boss joint portion 260 is formed of a fiber-reinforced composite material, it is advantageous that carbon fiber or glass fiber included therein is 5 to 60 wt % in comparison to an overall weight of the boss joint portion 260.

According to the embodiment of the present invention, since the liner 10 is formed of a plastic material and the boss joint portion 260 of the boss 20, which comes into surface contact with and is coupled to the opening surface of the liner 10, is the same plastic material or a fiber-reinforced composite material including the same plastic material, an interface joint between the liner 10 and the boss 20 forms an interface joint between the same materials. Accordingly, it is advantageous to improve degradation of a coupling force which may be generated on a heterogeneous material joint interface and to improve gas leak blocking performance. It is possible to suppress damage to the interface between the liner 10 and the boss 20 and a leak of high-pressure gas. Also, as described above, when the laser-fused interface 279 is further provided, it is more advantageous.

In the boss joint portion 260 which surrounds the outer circumferential surface of the boss body 210, a metal ring 290 is installed and surrounds the boss body 210 so as to reinforce sealing performance between the boss body 210 and the boss joint portion 260. According to the embodiment of the present invention, the metal ring 290 is manufactured using an aluminum material (Al6061).

According to the embodiment of the present invention, the boss body 210 and the boss joint portion 260 are integrally injection-molded to have a physical coupling part using a fixing groove 222 and a fixing protrusion 262. Accordingly, even when the boss 20 is formed through heterogeneous injection molding of a metallic material and a composite resin or a fiber-reinforced composite material, a coupling force may be improved.

As shown in FIGS. 1 and 2, the boss body 210 includes a flange portion 220 having a circular plate shape radially extending at a bottom along a bottom of the boss joint portion 260. The flange portion 220 increases a resistant force of the pressure vessel against longitudinal pressure. In addition, the flange portion 220 includes a plurality of such fixing grooves 222 which have a through hole shape and are arranged annularly. Also, the fixing protrusions 262, which extend from the boss joint portion 260, pass through and protrude from the respective fixing grooves 222. Ends of the fixing protrusions 262 extend outward and form holding portions so as to prevent the fixing protrusions 262 from being detached from the fixing grooves 222.

According to the embodiment of the present invention, when the boss is manufactured, the boss body 210 and the boss joint portion 260 are integrally molded through insert-injection molding so that the fixing grooves 222 and the fixing protrusions 262 are formed so as to physically restrict each other. Since the boss body 210 and the boss joint portion 260 are integrally molded while being joined and physically coupled to each other at the same time during the molding process, the boss body 210 and the boss joint portion 260 may firmly maintain integrity.

FIGS. 4 and 5 are partial cross-sectional views of the pressure vessel which illustrate a modified example of the flange portion 220 of the boss body 210 according to the embodiment of the present invention.

Referring to FIG. 4, in comparison to the embodiment shown in FIG. 1, the flange portion 220 of the boss body 210 is formed to extend to a size corresponding to the bottom of the boss joint portion 260 and to cover the bottom of the boss joint portion 260. A radial outer end of the flange portion 220 may be formed to be parallel to the first side part of the boss joint portion 260. The fixing grooves 222 formed in the flange portion 220 are arranged along two concentric circles around the through hole 230 and the fixing protrusions 262 are coupled thereto. Since the flange portion 220 is formed to extend corresponding to the boss joint portion 260, it is advantageous for the fixing grooves 222 and the fixing protrusions 262 to be arranged in two concentric circles and to physically form a coupling portion and it is possible to improve pressure-resistant stability of the boss 20.

Also, since the flange portion 220 having a metallic material covers the boss joint portion 260 formed of a heterogeneous injection-molded plastic material or a composite material including a plastic material and supports a shape thereof, there is an advantage of suppressing shape deformation of the boss joint portion 260 caused by a pressure difference generated between when the pressure vessel is charged with a hydrogen gas and when the hydrogen gas is discharged from the pressure vessel.

Referring to FIG. 5, the flange portion 220 of the boss body 210 is further formed to extend in comparison to the modified example shown in FIG. 4 so that an outer end of the flange portion 220 comes into contact with the liner 10. Since the flange portion 220 is formed to extend to come into radial contact with the liner 10, it is possible to prevent a step formed between the liner 10 and the flange portion 220. When there is a step between the liner 10 and the flange portion 220, a stress may be concentrated on a corresponding part. However, according to the modified example shown in FIG. 5, this possibility may be prevented. Also, according to the modified example shown in FIG. 5, even when high pressure is applied, a gap between the boss joint portion 260 and the liner 10 may be further prevented. Accordingly, pressure-resistant stability of the boss 20 is further improved.

FIGS. 6A to 6C are views illustrating a structural analysis result of a comparative experiment of a coupling force at an interface between the liner and the boss according to a shape of the outer surface of the boss joint portion in the pressure vessel.

In FIGS. 6A to 6C, the boss body is manufactured using Al6061 and the boss joint portion is manufactured using LFT including glass fiber of 20 wt % and PP. As an example, the liner is manufactured using a method of blow molding a resin PA6. In Embodiment 1 in FIG. 6A and Comparative Examples 1 and 2 in FIGS. 6B and 6C, an experiment is performed without forming a laser fused interface.

Comparing FIGS. 6A to 6C to one another, under the same pressure-resistant conditions (1,925 bars), it can be seen that a partial gap occurred between the boss joint portion and the liner but the boss was not detached in Embodiment 1. However, in Comparative Example 1 in which an outer surface of a boss joint portion is a uniform side surface shape and Comparative Example 2 in which a single surface tapered outward from a boss body is formed, results in which a boss was detached from a liner were seen. Accordingly, it may be seen that the outer surface shape according to the embodiment of the present invention improves coupling intensity with the liner.

Although the partial gap occurred at the interface between the boss joint portion and the liner even in Embodiment 1 of FIG. 6A, a test of FIG. 6 was performed while a composite shell surrounding the boss and the liner was not formed outside the liner. When a composite shell is formed as shown in FIG. 7, it is possible to prevent the interface between the liner and the boss from being destroyed.

FIG. 7 is a view illustrating a structural analysis result of applying the composite shell to Embodiment 1 exemplified in FIG. 6A. In a structural analysis of FIG. 7, the composite shell surrounds the outer surface of the liner and the outer circumferential surface of the boss body which is drawn outward from the liner. As an example, the composite shell is formed of a carbon fiber reinforced composite material (Toray T770). In a test of FIG. 7, an analysis result is obtained by applying a designed explosion pressure of 1,925 bars.

Although a stress value near the composite shell formed of a carbon fiber layer maximally emerges as 2,732 Mpa in accordance with a result of Embodiment 1 of FIG. 7, a detached or damaged part of the boss from the pressure vessel does not occur in Embodiment 1 even in a condition of reaching the designed explosion pressure.

FIG. 8 is a view illustrating a structural analysis result in order to confirm an effect of laser-fused interface in the pressure vessel boss according to the embodiment of the present invention. In Embodiment 2, the laser-fused interface is formed as shown in FIG. 3. In this case, even in a coupled state between the liner and the boss, it may be seen that a gap of the interface between the boss joint portion and the liner, which is caused by internal pressure, is suppressed. That is, it may be seen that forming of the laser-fused interface may further improve bond strength between the liner and the boss so that gas leak prevention performance may be further improved.

Table 1 shows a lightening effect of the boss for the pressure vessel according to the embodiment of the present invention.

TABLE 1

| Classification | Embodiment 3 | Embodiment 4 | Embodiment 5 | Comparative Example 3 |
|---|---|---|---|---|
| Weight (kg) | 1.256 | 1.224 | 1.22 | 1.684 |
| Lightening Rate | 25.4 | 27.3 | 27.5 | — |

In Embodiment 3, the boss body is manufactured using an aluminum material (Al6061) and the boss joint portion is integrally manufactured through heterogeneous injection molding GF LFT (20%) in which a resin PA is reinforced with glass fiber. In Embodiment 4, the boss joint portion is integrally manufactured through heterogeneous injection molding CF LFT (20%) in which carbon fiber is reinforced in comparison to Embodiment 3. In Embodiment 5, the boss joint portion is integrally manufactured through heterogeneous injection molding a resin PA in comparison to Embodiment 3. Comparative Example 3 relates to an example in which a boss and a boss joint portion are integrally molded using an aluminum material (Al6061). According to Table 1, it may be seen that a lightening effect of 25 to 27% may be achieved in Embodiments 3 to 5 in comparison to the boss formed of aluminum material 100% (Comparative Example 3). Accordingly, in the embodiment in which the boss body and the boss joint portion are integrally molded through injection molding of heterogeneous materials, an effect of increasing weight efficiency of a vessel product may be additionally achieved.

The invention claimed is:

1. A boss for a pressure vessel, comprising:
   a boss body in which a through hole configured to connect an interior to an exterior of the pressure vessel is formed; and
   a boss joint portion which surrounds an outer surface of the boss body, radially extends outward, and has an outer surface coming into surface contact with and joined to an opening surface of a liner, wherein the outer surface has a cross-sectional shape having three or more line segments connecting a top to a bottom of the boss joint portion and including at least one convex corner and at least one concave corner,
   wherein the outer surface comprises a stepwise cross section including a first side part on a lower side of the boss joint portion, a second side part on an upper side of the boss joint portion spaced apart from the first side part, and a stepped surface connecting the first side part and the second side part to each other,
   wherein each of the first side part and the second side part is formed to be tapered,
   wherein the first side part and the second side part are tapered in opposite directions,
   wherein the first side part has a greater separation distance from a central line than the second side part,
   wherein the first side part is tapered in a shape in which a radial distance from the central line is gradually reduced toward a bottom of the boss joint portion,
   wherein the second side part is tapered in a shape in which a radial distance from the central line is gradually reduced toward a top of the boss joint portion, and
   wherein the first side part, the second side part, and the stepped surface overall come into surface contact with and joined to the opening surface of the liner.

2. The boss of claim 1, wherein at least a part of an interface on which the opening surface of the liner and the outer surface of the boss joint portion are bonded is laser-fused.

3. The boss of claim 1, wherein the boss body is formed of a metallic material, and wherein the boss joint portion is formed of a plastic material or a plastic composite material.

4. The boss of claim 3, further comprising a physical coupling portion including fixing grooves and fixing protrusions to fix the boss joint portion and the boss body to each other.

5. The boss of claim 4, wherein the boss body comprises a flange portion formed on a lower side to radially extend along the bottom of the boss joint portion and comprising a plurality of the fixing grooves, and wherein the boss joint portion comprises the fixing protrusions protruding through the fixing grooves and having ends radially extending and held by the flange portion.

6. The boss of claim 5, wherein the flange portion is formed to have a size at least adequate for covering the bottom of the boss joint portion.

7. The boss of claim 3, wherein the boss joint portion is formed of a fiber-reinforced composite material in which a plastic material is reinforced with carbon fiber or glass fiber.

8. The boss of claim 3, wherein the plastic material of the boss joint portion is a polyolefin-based resin, a polyamide-based resin, or a composite resin comprising at least one of a polyolefin-based resin and a polyamide-based resin.

9. The boss of claim 1, comprising a metal ring configured to surround an outer circumferential surface of the boss body and extending toward an interior of the boss joint portion.

10. A pressure vessel comprising:
a plastic liner;
a boss comprising a metallic boss body, in which a through hole is formed, and a boss joint portion formed of a plastic material or a plastic composite material, surrounding an outer surface of the boss body and radially extending outward therefrom and having an outer surface coming into surface contact with and joined to an opening surface of the liner, in which the outer surface has a cross section including a first side part on a lower side, a second side part on an upper side, and a stepped surface connecting the first and second side parts to each other, the first side part is tapered to gradually reduce a radial distance from a central line of the through hole toward a bottom of the boss joint portion, and the second side part is tapered to gradually reduce a radial distance from the central line of the through hole toward a top of the boss joint portion, the boss joint portion integrally molded with the boss body, and a physical coupling portion for physically fixing the boss joint portion and the boss body to each other; and
a composite shell configured to surround an outer circumferential surface of the liner,
wherein the first side part, the second side part, and the stepped surface overall come into surface contact with and joined to the opening surface of the liner.

11. The pressure vessel of claim 10, wherein the liner is integrally molded with the boss through blow molding so that the outer surface of the boss body and the opening surface of the liner come into surface contact with and are joined to each other.

12. The pressure vessel of claim 10, wherein at least one of the second side part and the stepped surface located between the first side part and the second side part is laser-fused.

13. The pressure vessel of claim 10, wherein the boss body comprises a flange portion formed to radially extend along the bottom of the boss joint portion, and wherein the physical coupling portion comprises a plurality of fixing grooves formed in the flange portion and fixing protrusions formed while the boss joint portion is integrally molded with the boss body, protruding through the fixing grooves, and having ends radially extending and held by the flange portion.

14. The pressure vessel of claim 13, wherein the flange portion has an outer end formed to extend to come into contact with the liner.

* * * * *